US012744048B2

(12) United States Patent
Tzur et al.

(10) Patent No.: US 12,744,048 B2
(45) Date of Patent: Sep. 22, 2026

(54) UNIFIED POST-FILTER FOR AN AUDIO FILTER SYSTEM FOR VEHICLE

(71) Applicant: GM Global Technology Operations LLC, Detroit, MI (US)

(72) Inventors: Moshe Tzur, Petah Tikva (IL); Elior Hadad, Ness-Ziona (IL); Amos Schreibman, Hod Hasharon (IL)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 18/920,904

(22) Filed: Oct. 20, 2024

(65) Prior Publication Data

US 2026/0112380 A1 Apr. 23, 2026

(51) Int. Cl.

*G10L 21/0216* (2013.01)
*G10L 25/18* (2013.01)
*H04R 3/00* (2006.01)
*H04R 3/04* (2006.01)

(52) U.S. Cl.

CPC .......... *G10L 21/0216* (2013.01); *G10L 25/18* (2013.01); *H04R 3/005* (2013.01); *H04R 3/04* (2013.01); *G10L 2021/02166* (2013.01); *H04R 2499/13* (2013.01)

(58) Field of Classification Search

CPC ........... H04S 3/008; H04S 7/30; H04R 3/001; H04R 5/021; H04R 2420/07

See application file for complete search history.

(56) References Cited

U.S. PATENT DOCUMENTS 11,462,231 B1 * 10/2022 Shankar ................ G10L 21/034
2003/0177006 A1 * 9/2003 Ichikawa ............ G10L 21/0216 704/231

(Continued)

FOREIGN PATENT DOCUMENTS

CN 110931036 A * 3/2020 ......... G10L 21/0232
CN 113851141 A * 12/2021 ......... G10L 21/0208
CN 110931036 B * 3/2022 ......... G10L 21/0232

(Continued)

*Primary Examiner* — Duc Nguyen

(74) *Attorney, Agent, or Firm* — Honigman LLP; Matthew H. Szalach

(57) ABSTRACT

A computer-implemented method when executed by data processing hardware causes the data processing hardware to perform operations. The operations include receiving, from a sensor array, an audio signal at a unified post-filter, converting, via a conversion function, the audio signal into a Short-Time Fourier Transform (STFT) domain, determining, based on the converted audio signal, a speech-presence probability, and determining, based on the speech-presence probability, a noise smoothing factor. The operations also include estimating, via the unified post-filter, a noise power spectral density based on the noise smoothing factor, estimating, via the unified post-filter, a steering vector of a desired source, and generating, via the unified post-filter, a directionality-based mask and a coherence-based mask. The operations further include generating, based on the directionality-based mask and the coherence-based mask, a residual echo spectrum estimation and setting one or more spectral shaping factors based on the residual echo spectrum estimation.

20 Claims, 4 Drawing Sheets

(56) References Cited

U.S. PATENT DOCUMENTS

| | | | | |
|---|---|---|---|---|
| 2012/0158404 | A1* | 6/2012 | Shin | G10L 21/0216 704/E15.039 |
| 2018/0130482 | A1 | 5/2018 | Michel et al. | |

FOREIGN PATENT DOCUMENTS

| | | | | | |
|---|---|---|---|---|---|
| CN | 114708880 | A | * | 7/2022 | G10L 21/0216 |
| CN | 114999521 | A | * | 9/2022 | G10L 21/0216 |
| CN | 115713946 | A | * | 2/2023 | |
| CN | 117219108 | A | * | 12/2023 | |
| CN | 118053440 | A | * | 5/2024 | G10L 25/87 |
| DE | 102018117556 | A1 | | 1/2019 | |
| WO | WO-2016147020 | A1 | * | 9/2016 | G10L 21/0232 |
| WO | WO-2023228785 | A1 | * | 11/2023 | G10L 21/0208 |

* cited by examiner

UNIFIED POST-FILTER FOR AN AUDIO FILTER SYSTEM FOR VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a unified post-filter and more specifically to a unified post-filter for noise and residual echo suppression within a vehicle.

During phone calls or other microphone exchanges, there may be a presence of audible residual echo. For example, the speaker may experience hearing their own voice after speaking. To suppress the echo component, a typical linear acoustic echo cancellation first generates an estimate of the echo signal, which is then subtracted from the microphone signal. However, residual echoes persist due to filter misalignment, reverberation, and non-linear echo components. Thus, there is a need for an improved filter that improves speech quality by reducing distortion and improves total noise suppression.

SUMMARY

In some aspects, a computer-implemented method when executed by data processing hardware causes the data processing hardware to perform operations. The operations include receiving, from a sensor array, an audio signal at a unified post-filter, converting, via a conversion function, the audio signal into a Short-Time Fourier Transform (STFT) domain, determining, based on the converted audio signal, a speech-presence probability, and determining, based on the speech-presence probability, a noise smoothing factor. The operations also include estimating, via the unified post-filter, a noise power spectral density based on the noise smoothing factor, estimating, via the unified post-filter, a steering vector of a desired source, and generating, via the unified post-filter, a directionality-based mask and a coherence-based mask. The operations further include generating, based on the directionality-based mask and the coherence-based mask, a residual echo spectrum estimation and setting one or more spectral shaping factors based on the residual echo spectrum estimation.

In some examples, the audio signal may include the desired source, residual ambient noise, and a residual echo. Optionally, determining the noise power spectral density may include determining an active speaker probability. In some instances, generating the directionality-based mask may include utilizing spatial information and distinguishing the desired source from a residual echo of the audio signal. Additionally or alternatively, generating the coherence-based mask may include masking an estimated echo of the audio signal. In further instances, generating the residual echo spectrum estimation may include extracting a residual echo of the audio signal from an original echo of the audio signal. The operations may also include implementing, via the unified post-filter, a parametric variant of a Wiener filter.

In another aspect, an audio filter system for a vehicle includes data processing hardware and memory hardware in communication with the data processing hardware. The memory hardware stores instructions that when executed on the data processing hardware cause the data processing hardware to perform operations. The operations include receiving, from a sensor array, an audio signal at a unified post-filter, converting, via a conversion function, the audio signal into a Short-Time Fourier Transform (STFT) domain, determining, based on the converted audio signal, a speech-presence probability, and determining, based on the speech-presence probability, a noise smoothing factor. The operations also include estimating, via the unified post-filter, a noise power spectral density based on the noise smoothing factor, estimating, via the unified post-filter, a steering vector of a desired source, and generating, via the unified post-filter, a directionality-based mask and a coherence-based mask. The operations further include generating, based on the directionality-based mask and the coherence-based mask, a residual echo spectrum estimation and setting one or more spectral shaping factors based on the residual echo spectrum estimation.

In some examples, the audio signal may include the desired source, residual ambient noise, and a residual echo. Optionally, determining the noise power spectral density may include determining an active speaker probability. In some instances, generating the directionality-based mask may include utilizing spatial information and distinguishing the desired source from a residual echo of the audio signal. Additionally or alternatively, generating the coherence-based mask may include masking an estimated echo of the audio signal. In other instance, generating the residual echo spectrum estimation may include extracting a residual echo of the audio signal from an original echo of the audio signal. The operations may further include implementing, via the unified post-filter, a parametric variant of a Wiener filter.

In yet another aspect, an audio filter system for a vehicle includes data processing hardware and memory hardware in communication with the data processing hardware. The memory hardware stores instructions that when executed on the data processing hardware cause the data processing hardware to perform operations. The operations include receiving, from a sensor array, an audio signal at a unified post-filter, converting, via a conversion function, the audio signal into a Short-Time Fourier Transform (STFT) domain, determining, based on the converted audio signal, a speech-presence probability, determining, based on the speech-presence probability, a noise smoothing factor, and estimating, via the unified post-filter, a noise power spectral density based on the noise smoothing factor. The operations also include estimating, via the unified post-filter, a steering vector of a desired source, generating, via the unified post-filter, a directionality-based mask and a coherence-based mask, generating, based on the directionality-based mask and the coherence-based mask, a residual echo spectrum estimation, setting one or more spectral shaping factors based on the residual echo spectrum estimation, and implementing, via the unified post-filter, a parametric variant of a Wiener filter.

In some examples, the audio signal may include the desired source, residual ambient noise, and a residual echo. Optionally, determining the noise power spectral density may include determining an active speaker probability. In some instances, generating the directionality-based mask may include utilizing spatial information and distinguishing the desired source from a residual echo of the audio signal. Additionally or alternatively, generating the coherence-based mask may include masking an estimated echo of the audio signal. In other instances, generating the residual echo spectrum estimation may include extracting a residual echo of the audio signal from an original echo of the audio signal.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
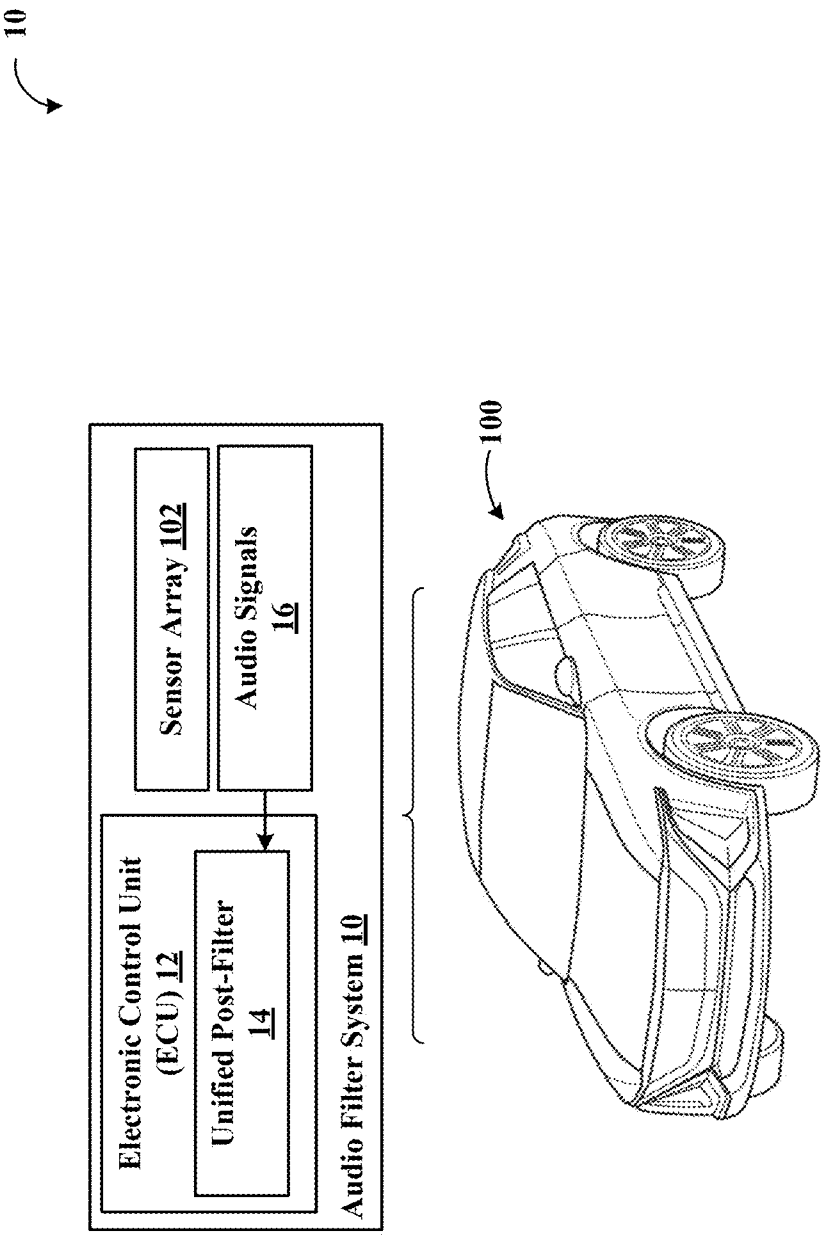
FIG. 1 is an exemplary schematic of a vehicle equipped with an audio filter system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
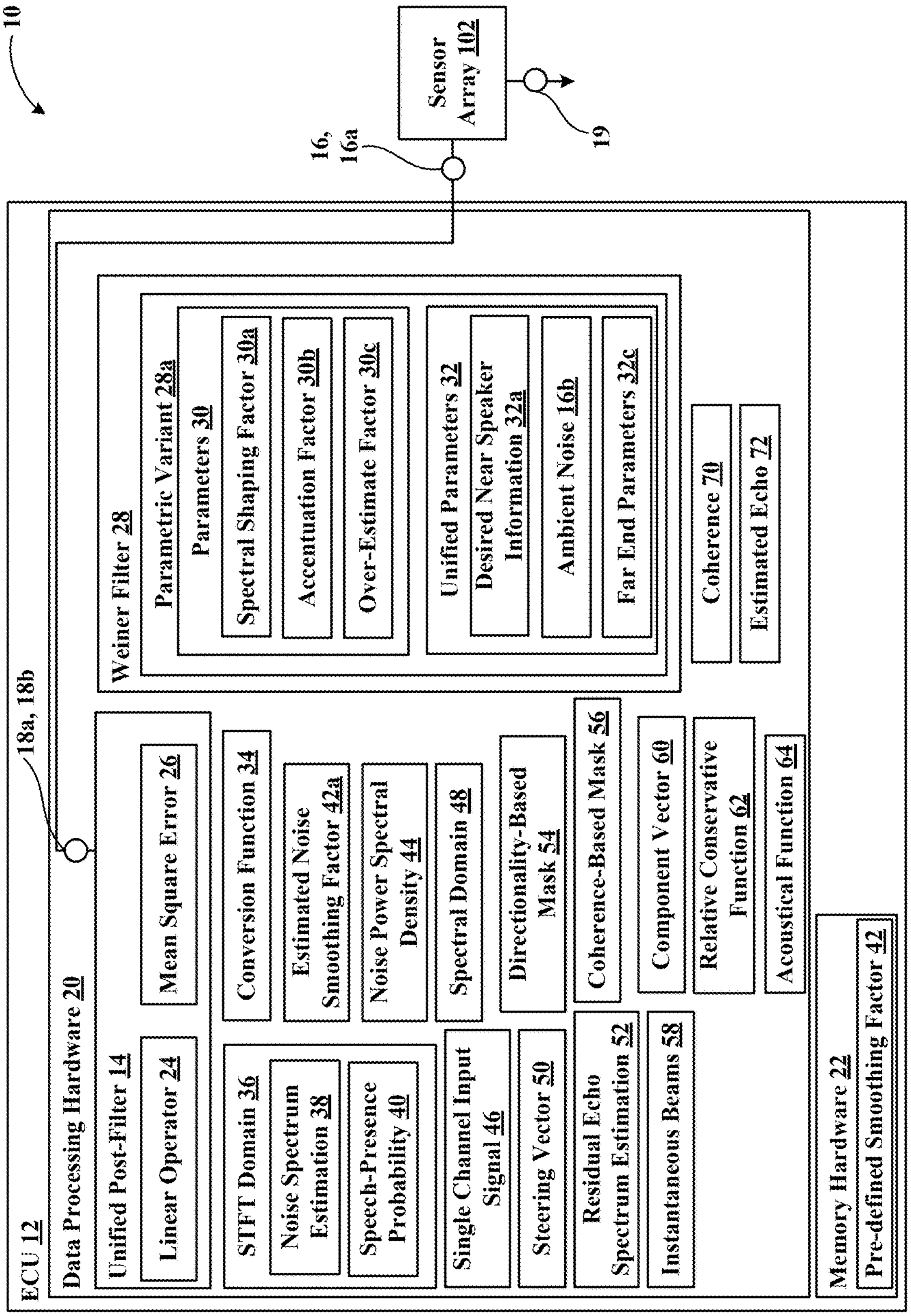
FIG. 2 is an exemplary block diagram of an audio filter system according to the present disclosure.
Figure 3:
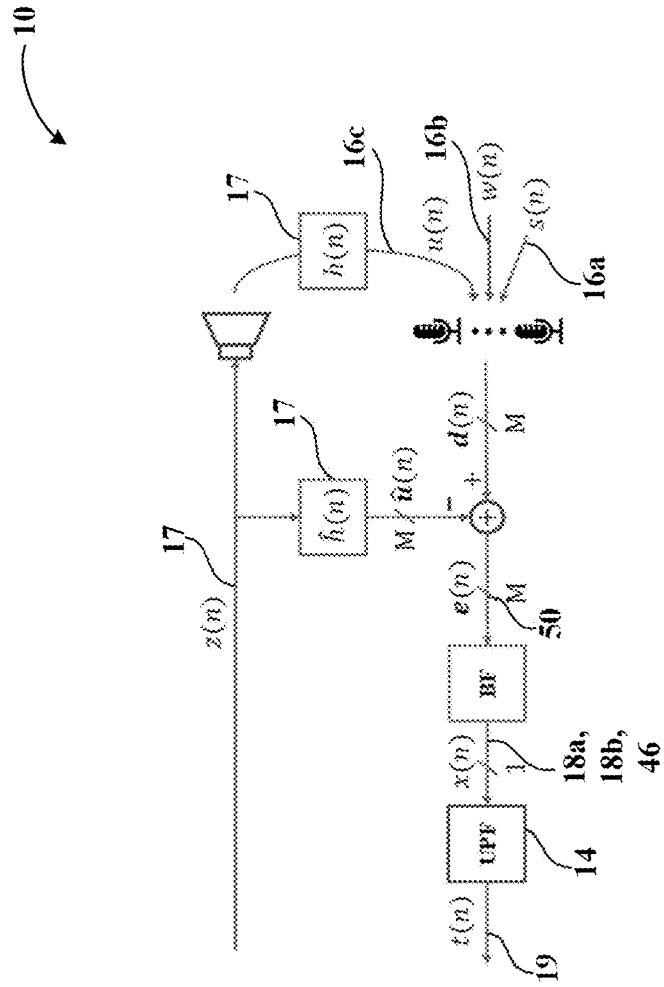
FIG. 3 is an example schematic of an audio filter system according to the present disclosure.

Referring to FIGS. 1-3, an audio filter system 10 according to the present disclosure for a vehicle 100 includes an electronic control unit (ECU) 12 configured with a unified post-filter 14. It is also contemplated that in other examples, the audio filter system 10 may be utilized in computer systems other than with respect to a vehicle. Such examples include, but are not limited to, mobile devices, headsets, earphones, speaker systems, and any other practicable device utilizing voice-to-voice and/or voice-to-machine (ASR) communication via an audio system. The audio filter system 10 is described herein with respect to the vehicle 100 for exemplary purposes.

The audio filter system 10 may be electrically coupled to a sensor array 102 of the vehicle 100 to receive audio signals 16. In some examples, the sensor array 102 may include a microphone array and/or a loudspeaker within the vehicle 100 configured to capture, at least in part, the audio signals 16. Digital signals 17 may also be processed through the audio filter system 10 and are generally related to the audio signals 16. The audio signals 16 include a desired source **16*a*, perceived ambient noise 16*b*, and a perceived echo 16*c*. After the audio signals 16 pass through an acoustic echo canceler (AEC) and a beamformer, the remaining signals include residual ambient noise 18*a* and a residual echo 18*b*, described below. For example, the input 46 to the unified post-filter 14** may be represented by the following equation:

$$x(k, n) = s(k, n) + r(k, n) + v(k, n) \tag{1}$$

where x(k, n) is the audio signal 16 after linear processing 46; s(k, n) is the desired source **16*a*; r(k, n) is the residual echo 18*b*; and v(k, n) is the residual ambient noise 18*a***.

As described herein, the audio filter system 10 coordinates the ECU 12 with the unified post-filter 14 to monitor the audio signals 16 and adjust an audio output from the audio filter system 10. The ECU 12 includes data processing hardware 20 and memory hardware 22 that may store instructions and operations of the audio filter system 10 that may be executed by the data processing hardware 20. In some examples, the unified post-filter 14 may be configured as part of the ECU 12. In other examples, the unified post-filter 14 may be separate from the ECU 12 and may be in communication with the ECU 12.

The unified post-filter 14 is configured, as described herein, to isolate the desired source 16*a* from the residual ambient noise 18*b* and the residual echo 18*b*. For example, the unified post-filter 14 is configured to identify a linear operator 24 which estimates the desired source 16*a* using a mean square error (MSE) 26. The unified post-filter 14 is configured to determine the MSE 26 of a difference between the desired source 16*a* and the received audio signal 16 as a whole. For example, the linear operator 24 may be determined using the following equation:

$$G_{opt}(k, n) = \text{argmin}_G\ E\left[(s(k, n) - G(k, n)x(k, n))^2\right] \quad (2)$$

where $G_{opt}(k, n)$ is the linear operator 24; $\text{argmin}_G$ finds the optimal applied post filter on x; E is an expectation operator; s(k, n) is the desired source 16*a*; G(k, n) an applied post filter on (x) that approximates the desired source (s); and x(k, n) is the post-filter's single channel input signal.

In one example, the audio filter system 10 utilizes the linear operator 24 to define a modified Wiener filter 28. For example, the audio filter system 10 may introduce a parametric variant 28*a* of the Wiener filter 28, which may be utilized to generate and refine the unified post-filter 14. The parametric variant 28*a* of the Wiener filter 28 utilizes parameters 30 including a spectral shaping factor 30*a*, an accentuation factor 30*b*, and an over-estimate factor 30*c* of the residual echo 18*b*. These parameters 30 are pre-tuned to optimize speech quality and are interference suppression. For example, the parametric variant 28*a* of the Wiener filter 28 may be represented by the following equation:

$$\tilde{G}_{opt}(k, n) = \left(\frac{\phi_{ss}(k, n)}{\phi_{ss}(k, n) + \alpha(k)(\phi_{vv}(k, n) + \gamma(k)\phi_{rr}(k, n))}\right)^{\beta(k)} \quad (3)$$

where $\tilde{G}_{opt}(k, n)$ is the parametric variant 28*a*; $\alpha(k)$ is the spectral shaping factor 30*a*; $\beta(k)$ is the accentuation factor 30*b*; and $\gamma(k)$ is the over-estimate factor 30*c* of the residual echo 18*b*.

The parametric variant 28*a* also utilizes unified parameters 32 that ultimately define the unified post-filter 14. The unified parameters 32 are auto-correlations of the signals and include information regarding the desired near speaker 32*a* (represented by $\phi_{ss}(k, n)$ in equation (3)), residual ambient noise 16*b* (represented by $\phi_{vv}(k, n)$ in equation (3)) and residual echo 32*c* (represented by $\phi_{rr}(k, n)$ in equation (3)). The audio filter system 10 estimates each of the parameters 30 and may manipulate the parameters 30 to improve the overall performance of the unified post-filter 14. In particular, the audio filter system 10 may manipulate or otherwise modify the unified parameters 32 to refine the parametric variant 28*a* and improve the unified post-filter 14. For example, the unified post-filter 14 is configured to take into account all the unified parameters 32, which ultimately improves the filtration of the audio signals 16 received.

Prior to estimating the unified parameters 32, the audio filter system 10 converts the audio signal 16 using a conversion function 34 into a Short-Time Fourier Transform (STFT) domain 36. The STFT domain 36 may be utilized by the audio filter system 10 to calculate or otherwise generate a noise spectrum estimation 38. The noise spectrum estimation 38 is associated with the ambient noise 16*b*. The audio filter system 10 may also utilize the converted audio signal 16 from the STFT domain 36 to determine a speech-presence probability 40. The audio filter system 10 utilizes a zero (0) to one (1) scale when executing the speech-presence probability 40, such that the speech-presence probability 40 is a value between zero (0) and one (1). For example, the speech-presence probability 40 is utilized by the audio filter system 10 to detect whether a speaker is active. If a speaker is active with probability between zero (0) and one (1), then the audio filter system 10 will not estimate the unified parameters 32, because the audio signal 16 will include both ambient noise 16*b* and speech.

In addition to the speech-presence probability 40, the noise spectrum estimation 38 is based on a pre-defined noise smoothing factor 42, which may be stored in the memory hardware 22. The audio filter system 10 utilizes the pre-defined noise smoothing factor 42 to calculate an estimated noise smoothing factor 42*a*. For example, the estimated noise smoothing factor 42*a* may be calculated using the following equation:

$$\tilde{\lambda}_v(k, n) = \lambda_v(k) + (1 - \lambda_v(k))\eta(k, n) \quad (4)$$

where $\tilde{\lambda}_v(k, n)$ is the estimated noise smoothing factor 42*a;* $\lambda_v(k)$ is the pre-defined noise smoothing factor 42; and $\eta(k, n)$ is the speech-presence probability 40 and obtains values between zero (0) and one (1). The estimated noise smoothing factor 42*a* is utilized by the audio filter system 10 to smooth the ambient noise 16*b* and the audio signal 16 itself. The audio filter system 10, when estimating the noise smoothing factor 42*a* and determining the speech-presence probability 40 may be configured to remove any desired source 16*a* from the audio signal 16 to focus on the ambient noise 16*b* and/or residual ambient noise 18*a* in the audio signal 16.

Once the audio filter system has determined or otherwise estimated the estimated noise smoothing factor 42*a*, the audio filter system 10 may estimate a noise power spectral density 44. The noise power spectral density 44 may be utilized to determine an active speaker probability 40*a* of the speech-presence probability 40. The active speaker probability 40*a* For example, the noise power spectral density 44 may be estimated using the following equation:

$$\hat{\phi}_{vv}(k, n) = \tilde{\lambda}_v(k, n)\phi_{vv}(k, n-1) + \left(1 - \tilde{\lambda}_v(k, n)\right)|x(k, n)|^2 \quad (5)$$

where $\hat{\phi}_{vv}(k, n)$ is the residual ambient noise power spectral density 44; $\tilde{\lambda}_v(k, n)$ is estimated noise smoothing factor 42*a*; x(k, n) is the post-filter's single channel input signal 46; $\lambda_v(k)$ is the pre-defined noise smoothing factor 42; $\phi_{vv}(k, n)$ is the ambient noise 16*b*; and $\eta(k, n)$ is the speech-presence probability 40. The smoothing is between the audio signal 16 in a frame and a previous estimation. The audio filter system 10 may identify an active speaker based on the speech-presence probability 40. As mentioned above, the speech-presence probability 40 may range between zero (0) and one (1), such that if the speech-presence probability 40 is closer to one (1) then the noise is not updated and a previous estimation is used. If the speech-presence probability 40 is near zero (0), then the audio filter system 10 may update the noise estimation. Thus, the noise is estimated when there is no speech, meaning when the speech-presence probability 40 is close to one (1) the audio filter system 10 relies on the previous noise estimation.

The ambient noise 16*b* and/or the residual ambient noise 18*a* is estimated in a complex domain 48. The complex domain 48 includes spectral power and phase power of the microphones and generally correlates with the channel input signal 46 squared, described in more detail below. In order to get a residual echo spectrum estimation 52, the audio filter system 10 generates a directionality-based mask 54 and a coherence-based mask 56, described in more detail below. The residual echo spectrum estimation 52 may determined using the following equation:

$$\hat{\phi}_{rr}(k,n) = M_d(k,n)M_c(k,n)\,|\hat{u}(k,n)|^2 \tag{6}$$

where $\hat{\phi}_{rr}(k, n)$ is the residual echo spectrum estimation 52; $M_d(k, n)$ is the directionality-based mask 54; $M_C(k, n)$ is the coherence-based mask 56; and $\hat{u}(k, n)$ is estimated echo which is estimated in an acoustic echo canceler module as part of the linear acoustic echo cancellation.

The directionality-based mask 54 exploits spatial information to distinguish the desired source 16*a* from the residual echo 18*b*. For example, the directionality-based mask 54 is related to the spectral domain 48, which informs the audio filter system 10 as to the environmental domain of the vehicle 100. The spectral domain 48 provides the environmental information for the audio filter system 10. In some instances, the directionality-based mask 54 may be at least partially determined by the audio filter system 10 utilizing instantaneous beams 58 from the spectral domain 48. The instantaneous beams 58 may be determined using the following equation:

$$\psi(k,n) = \max_{i=1,\ldots,N_p} \frac{|x(k,n)|^2}{e^H(k,n)\left(I - \frac{h_i(k,n)h_i^H(k,n)}{h_i^H(k,n)h_i(k,n)}\right)e(k,n)} \tag{7}$$

where $\psi(k, n)$ is the instantaneous beams 58; i is an index upon which a maximum number of available speakers is searched; $x(k, n)$ is the input signal to the unified post-filter 14 (i.e., the output of a beamformer module); I is an identity matrix; hi is the steering vector 50; and $e(k, n)$ is a component vector 60.

The unified post-filter 14 receives the estimated steering vector 50 from the beamformer module, which is used to generate the directionality-based mask 54. The unified post-filter 14 is utilized to estimate a component of the desired source 16*a* in the vehicle 100. The component may be a relative conservative function 62 or an acoustical function 64. The steering vector 50 represents knowledge of the desired source 16*a* within the vehicle 100. For example, the audio filter system 10 may utilize spatial information 104 of the vehicle 100 when distinguishing the desired source 16*a* from the residual echo 18*b* of the audio signal 16. If there are more than one (1) speakers, then the audio filter system 10 may utilize a blocking matrix to block the speakers and identify the desired source 16*a*. For example, the audio filter system 10 may utilize the component vector 60 compared with the steering vector 50 to obtain a value.

The component vector 60 is the sensor array 102 without a linear echo. Thus, the audio filter system 10 may check the relationship between the component vector 60 and the steering vector 50 with the received audio signal 16. If only a near-end signal is detected, then the audio signal 16 will go to zero (0). If residual echo 18*b* is detected, the audio filter system 10 can determine the relationship between the residual echo 18*b* and the value. While the value may change over time, the component vector 60 is related to information related to the desired source 16*a* and also contains some information related to the residual echo 18*b*.

Referring again to equation (7), the audio filter system 10 may utilize or extract signal-to-noise ratio (SNR) levels to estimate the possible directions of the desired source 16*a*. For example, the SNR levels might be high if there is a presence of near-end signal and will be low if there is no near-end signal. The audio filter system 10 may utilize the SNR levels to determine the presence of near-end signals, which may assist the audio filter system 10 in attenuating the audio signal 16. For example, if the audio filter system 10 can identify that there are near-end signals present, then the audio filter system 10 can attenuate the audio signal 16 to only estimate a residual echo 18*b*. The result is the audio filter system 10 generating the directionality-based mask 54. For example, the directionality-based mask may be derived from the following equation:

$$M_d(k,n) = \min\left(1, \left(\frac{\langle\psi(k,n)\rangle_r}{\psi(k,n)}\right)\right) \tag{8}$$

where $M_d(k, n)$ is the directionality-based mask 54; $\langle \psi(k, n) \rangle_r$ is the average of the instantaneous beams 58; and $\psi(k, n)$ is the instantaneous beams 58. If the SNR level is high, then the audio filter system 10 infers that the directionality-based mask 54 will be close to zero (0). In determining the directionality-based mask 54, the audio filter system 10 checks the instantaneous beams 58 against the average of the instantaneous beams 58. The average of the instantaneous beams 58 is determined using the active echo 18*b*. If there is only residual echo 18*b* present, then the directionality-based mask 54 would approach one (1). If there is only a near-end signal, then the directionality-based mask 54 would approach zero (0), because the instantaneous beams 58 would be high and the average is preserved. Preserving the average means that the average is calculated based on only active reference beams, not including near-end beams.

The audio filter system 10 also generates the coherence-based mask 56, which is determined by comparing a coherence 70 between an estimated echo 72 and the input at the sensor array 102. The coherence-based mask 56 is a complementary mask to the directionality-based mask 54, such that the audio filter system 10 may utilize both the directionality-based mask 54 and the coherence-based mask 56. The coherence-based mask 56 provides an indication of the frequency beams that have a high probability for echo presence. The audio filter system 10 measures the correlation of coherence 70 between the audio signal 16 and the estimated echo 72, which is estimated using linear echo cancellation 74. If the correlation is high, the audio filter system 10 will have an indication of a frequency bin that has echo and may also be able to indicate presence of residual echo 18*b*. The audio filter system 10 may thus attenuate the echo to cancel the echo and/or residual echo 18*b* using the linear echo cancellation 74. The coherence-based mask may derived from the following exemplary equations:

$$\mu(k,n) = \frac{|E[d(k,n)\hat{u}^*(k,n)]|^2}{\hat{\sigma}_d^2(k,n)\hat{\sigma}_{\hat{u}}^2(k,n)} \tag{9}$$

-continued $$\rho(k,n)=\max\left(0,|x(k,n)|^2-\hat{\phi}_{vv}(k,n)\right) \tag{10}$$

$$\tilde{\phi}_{rr}(k,n)=(1-\mu(k,n))\tilde{\phi}_{rr}(k,n-1)+\mu(k,n)\rho(k,n) \tag{11}$$

$$M_c(k,n)=\frac{\tilde{\phi}_{rr}(k,n)}{|\hat{u}(k,n)|^2+\epsilon} \tag{12}$$

where, in equation (9), μ(k, n) is the coherence 70; E is an expectation operator; d(k, n) is the audio signal; û(k, n) is the estimated echo 72;

$$\sigma_d^2$$

(k, n) is an estimated variance of the audio signal 16; and $$\sigma_{\hat{u}}^2$$

(k, n) is an estimated variance of the estimated echo 72. In equation (10), ρ(k, n) is the result of spectral subtraction of the estimated noise floor from an input spectrum of the unified post-filter; x(k, n) is the input signal to the unified post-filter; and $\hat{\phi}_{vv}$(k, n) is the noise power spectral density 44. In equation (11), $\tilde{\phi}_{rr}$ (k, n) naive estimation of the residual echo 18*b* from the input signal x(k, n) 58; μ(k, n) is the coherence 70; $\tilde{\phi}_{rr}$ (k, n−1) is the naïve residual echo estimation from a previous time-frame. In equation (11), $M_C$(k, n) is the coherence-based mask 56; $\tilde{\phi}_{rr}$ (k, n) is the naive estimation of the residual echo 58; μ(k, n) is the instantaneous beams 58 is the estimated echo from the acoustic echo canceler; and ∈ is a small number.

The audio filter system 10 utilizes the directionality-based mask 54, the coherence-based mask 56, and the unified post-filter 14 to generate the residual echo spectrum estimation 52. The residual echo spectrum estimation 52 may be determined by multiplying the masks 54, 56 by a power of the residual echo 18*b* to mask the estimated echo 72. The audio filter system 10 is thus able to mask the residual echo 18*b* by masking the estimated echo 72. As a result, the audio filter system 10 may set one or more spectral shaping factors 30*a* based on the residual echo spectrum estimation 52 by extracting the residual echo 18*b* of the audio signal 16 from an original echo 16*d* of the audio signal 16. The directionality-based mask 54 further enhances the estimation of the residual echo 18*b* by cleaning the estimation from near-end signal presence. For example, the audio filter system 10 attenuates the noise power spectral densities 44 and extracts the residual echo 18*b* out of the estimated echo 72. Where the coherence-based mask 56 is utilized to equalize the power of the estimated echo 72 out of or from the residual echo 18*b*, the directionality-based mask 54 further enhances and cleans the near-end presence of the estimated echo 72.

Figure 4:
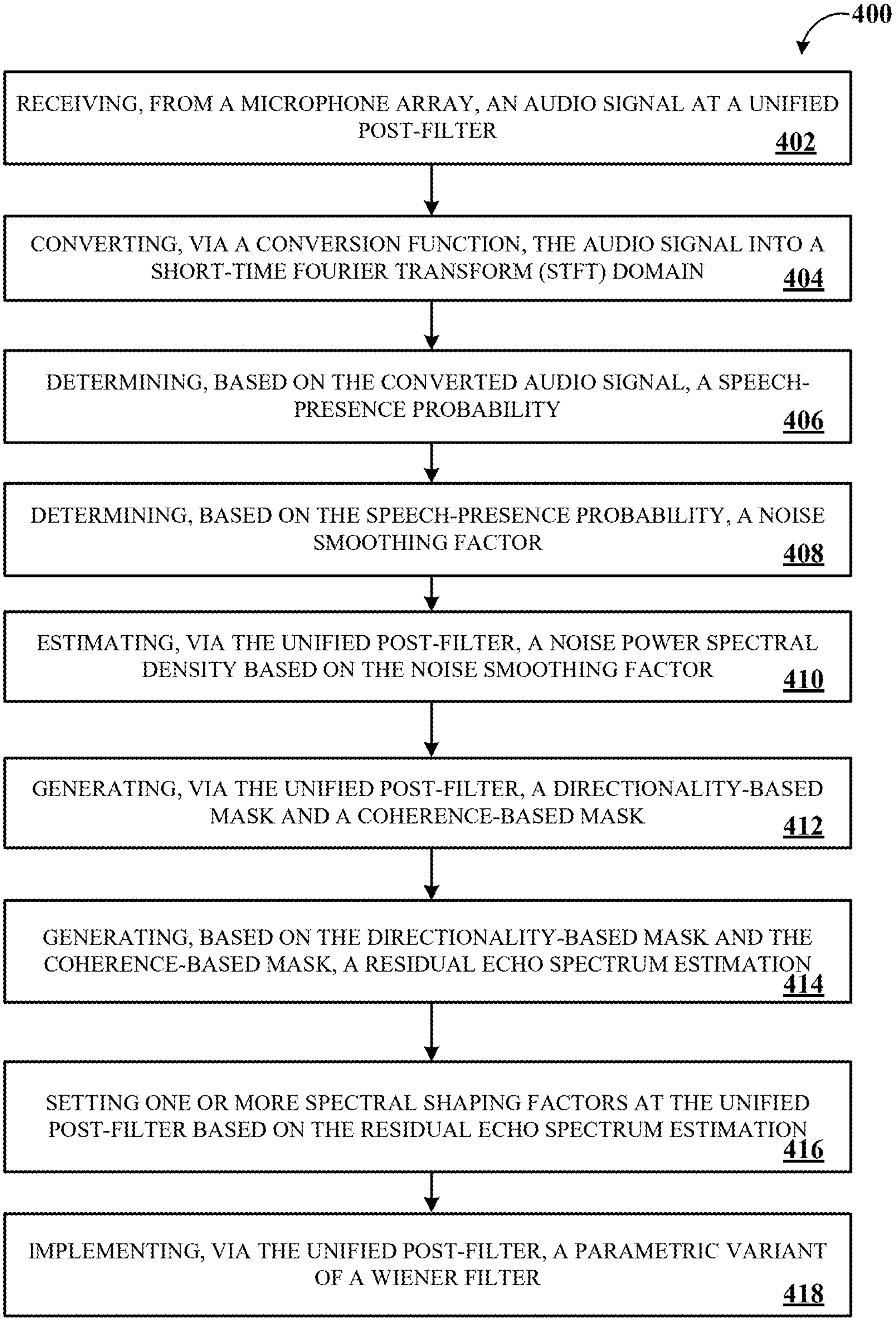
FIG. 4 is an example flow diagram for an audio filter system according to the present disclosure.

With specific reference to FIG. 4, an example method 400 flow diagram for the audio filter system 10 is illustrated. At 402, the unified post-filter 14 receives an audio signal 16 from a sensor array 102. The audio signal 16 is converted, at 404, into a STFT domain 36 via a conversion function 34. The audio filter system 10 determines, at 406, a speech-presence probability 40 based on the converted audio signal 16 and determines, at 408, a noise smoothing factor 42 based on the speech-presence probability 40. The unified post-filter 14 estimates, at 410, a noise power spectral density 44 based on the noise smoothing factor 42 and estimates, at 412, a steering vector 50 of a desired source 16*a*. The unified post-filter 14 generates, at 414, a directionality-based mask 54 and a coherence-based mask 56 and generates, at 416, a residual echo spectrum estimation 52 based on the directionality-based mask 54 and the coherence-based mask 56. The audio filter system 10 sets, at 416, one or more spectral shaping factors 30*a* based on the residual echo spectrum estimation 52 and implements, at 418, a parametric variant 28*a* of a Wiener filter 28 via the unified post-filter 14.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:
- receiving, from a sensor array, an audio signal at a unified post-filter;
- converting, via a conversion function, the audio signal into a Short-Time Fourier Transform (STFT) domain;
- determining, based on the converted audio signal, a speech-presence probability;
- determining, based on the speech-presence probability, a noise smoothing factor;
- estimating, via the unified post-filter, a noise power spectral density based on the noise smoothing factor;
- estimating, via the unified post-filter, a steering vector of a desired source;
- generating, via the unified post-filter, a directionality-based mask and a coherence-based mask;
- generating, based on the directionality-based mask and the coherence-based mask, a residual echo spectrum estimation; and
- setting one or more spectral shaping factors based on the residual echo spectrum estimation.

2. The method of claim 1, wherein the audio signal includes the desired source, residual ambient noise, and a residual echo.

3. The method of claim 1, wherein estimating the noise power spectral density includes determining an active speaker probability.

4. The method of claim 1, wherein generating the directionality-based mask includes utilizing spatial information and distinguishing the desired source from a residual echo of the audio signal.

5. The method of claim 1, wherein generating the coherence-based mask includes masking an estimated echo of the audio signal.

6. The method of claim 1, wherein generating the residual echo spectrum estimation includes extracting a residual echo of the audio signal from an original echo of the audio signal.

7. The method of claim 1, further including implementing, via the unified post-filter, a parametric variant of a Wiener filter.

8. An audio filter system for a vehicle, the audio filter system comprising:

data processing hardware; and memory hardware in communication with the data processing hardware, the memory hardware storing instructions that when executed on the data processing hardware cause the data processing hardware to perform operations comprising:

receiving, from a sensor array, an audio signal at a unified post-filter;

converting, via a conversion function, the audio signal into a Short-Time Fourier Transform (STFT) domain;

determining, based on the converted audio signal, a speech-presence probability;

determining, based on the speech-presence probability, a noise smoothing factor;

estimating, via the unified post-filter, a noise power spectral density based on the noise smoothing factor;

estimating, via the unified post-filter, a steering vector of a desired source;

generating, via the unified post-filter, a directionality-based mask and a coherence-based mask;

generating, based on the directionality-based mask and the coherence-based mask, a residual echo spectrum estimation; and setting one or more spectral shaping factors based on the residual echo spectrum estimation.

9. The system of claim 8, wherein the audio signal includes the desired source, residual ambient noise, and a residual echo.

10. The system of claim 8, wherein determining the noise power spectral density includes determining an active speaker probability.

11. The system of claim 8, wherein generating the directionality-based mask includes utilizing spatial information and distinguishing the desired source from a residual echo of the audio signal.

12. The system of claim 8, wherein generating the coherence-based mask includes masking an estimated echo of the audio signal.

13. The system of claim 8, wherein generating the residual echo spectrum estimation includes extracting a residual echo of the audio signal from an original echo of the audio signal.

14. The system of claim 8, further including implementing, via the unified post-filter, a parametric variant of a Wiener filter.

15. An audio filter system for a vehicle, the audio filter system comprising:

data processing hardware; and memory hardware in communication with the data processing hardware, the memory hardware storing instructions that when executed on the data processing hardware cause the data processing hardware to perform operations comprising:

receiving, from a sensor array, an audio signal at a unified post-filter;

converting, via a conversion function, the audio signal into a Short-Time Fourier Transform (STFT) domain;

determining, based on the converted audio signal, a speech-presence probability;

determining, based on the speech-presence probability, a noise smoothing factor;

estimating, via the unified post-filter, a noise power spectral density based on the noise smoothing factor;

estimating, via the unified post-filter, a steering vector of a desired source;

generating, via the unified post-filter, a directionality-based mask and a coherence-based mask;

generating, based on the directionality-based mask and the coherence-based mask, a residual echo spectrum estimation;

setting one or more spectral shaping factors based on the residual echo spectrum estimation; and implementing, via the unified post-filter, a parametric variant of a Wiener filter.

16. The system of claim 15, wherein the audio signal includes the desired source, residual ambient noise, and a residual echo.

17. The system of claim 15, wherein determining the noise power spectral density includes determining an active speaker probability.

18. The system of claim 15, wherein generating the directionality-based mask includes utilizing spatial information and distinguishing the desired source from a residual echo of the audio signal.

19. The system of claim 15, wherein generating the coherence-based mask includes masking an estimated echo of the audio signal.

20. The system of claim 15, wherein generating the residual echo spectrum estimation includes extracting a residual echo of the audio signal from an original echo of the audio signal.

* * * * *